(12) United States Patent
Asai

(10) Patent No.: US 6,876,661 B2
(45) Date of Patent: Apr. 5, 2005

(54) INFORMATION PROCESSING TERMINAL AND CONTENT DATA ACQUIRING SYSTEM USING THE SAME

(75) Inventor: Takayuki Asai, Tokyo (JP)

(73) Assignee: NEC Corporation, Tokyo (JP)

( * ) Notice: Subject to any disclaimer, the term of this patent is extended or adjusted under 35 U.S.C. 154(b) by 816 days.

(21) Appl. No.: 09/801,678

(22) Filed: Mar. 9, 2001

(65) Prior Publication Data

US 2001/0024444 A1 Sep. 27, 2001

(30) Foreign Application Priority Data

Mar. 14, 2000 (JP) ........................................ 2000-070405

(51) Int. Cl.$^7$ .......................... H04L 12/28; H04L 12/66; H04J 3/16
(52) U.S. Cl. ........................ 370/401; 370/352; 370/466; 709/219
(58) Field of Search ................................ 370/352, 401, 370/328, 466, 389, 392; 709/230, 232, 219, 217

(56) References Cited

U.S. PATENT DOCUMENTS

| | | | |
|---|---|---|---|
| 6,490,291 B1 * | 12/2002 | Lee et al. .................... | 370/401 |
| 6,509,913 B2 * | 1/2003 | Martin et al. ................ | 345/762 |
| 6,615,130 B2 * | 9/2003 | Myr ........................... | 701/117 |

FOREIGN PATENT DOCUMENTS

| | | |
|---|---|---|
| JP | H07-36679 A | 2/1995 |
| JP | H11-134264 A | 5/1999 |
| JP | 11-136365 | 5/1999 |
| WO | WO 98/36344 | 8/1998 |
| WO | WO 99/35595 | 7/1999 |
| WO | WO 99/61966 A2 | 12/1999 |

OTHER PUBLICATIONS

"Communication Service Expedition, Data Center which Aims Cooperation with Phone System", Interop Magazine, Softbank Publishing Inc., vol. 10, No. 1, Jan. 1, 2000, pp. 162–163.

T. Bickmore et al., "Digestor: device–independent access to the World Wide Web", Computer Networks and ISDN Systems, vol. 29, (1997), pp. 1075–1082 with Abstract.

D. Johnson, "Converting PC GUIs for NonPC Devices", Circuit Cellar Ink, (Feb. 1998), pp. 40–45.

* cited by examiner

*Primary Examiner*—Duc Ho
(74) *Attorney, Agent, or Firm*—Sughrue Mion, PLLC

(57) ABSTRACT

In a content data acquiring system, a portable terminal issues a content data request for content data desired by a user, and receives a desired content data file to reproduce the desired content data from the desired content data file. The first server is provided on a first network and can provide first content data files written in a first language. The first server transmits a desired one of the first content data files via the first network in response to the content data request when the content data request is destined to the first server. The second server is provided on a second network as the Internet and can provide second content data files written in a HTML (hypertext markup language) language. The first language is different from the HTML language. The second server transmits desired one of the second content data files via the second network when the content data request is destined to the second server. A gateway is operatively connected with the portable terminal and the first and second servers, and transfers the content data request from the portable terminal to the first or second server based on the content data request, and transfers the desired content data file from the first or second server to the portable terminal.

32 Claims, 14 Drawing Sheets

Fig. 8

| LARGE GROUP | MIDDLE GROUP | SMALL GROUP | IDENTIFIER |
|---|---|---|---|
| CHARACTER DATA | TEXT FILE | - | $c_0$ |
| | OTHERS | - | $c_1$ |
| | | RESERVED | $c_2$-$c_9$ |
| IMAGE DATA | STILL IMAGE | FILE SIZE <1 KBYTES | $s_0$ |
| | | FILE SIZE ≧1 KBYTES AND <10 KBYTES | $s_1$ |
| | | FILE SIZE≧ 10 KBYTES AND <50 KBYTES | $s_2$ |
| | | FILE SIZE≧ 50 KBYTES AND <100 KBYTES | $s_3$ |
| | | FILE SIZE≧ 50 KBYTES AND <100 KBYTES | $s_4$ |
| | | FILE SIZE≧ 100 KBYTES AND <500 KBYTES | $s_5$ |
| | | FILE SIZE≧ 500 KBYTES AND <1 MBYTES | $s_6$ |
| | | FILE SIZE ≧1 MBYTES | $s_7$ |
| | | RESERVED | $s_8$-$s_9$ |
| | PICTURE | FILE SIZE <100 KBYTES | $m_0$ |
| | | FILE SIZE ≧100 KBYTES AND<500 KBYTES | $m_1$ |
| | | FILE SIZE ≧500 KBYTES AND<1 MBYTES | $m_2$ |
| | | FILE SIZE ≧ 1 MBYTES | $m_3$ |
| | | RESERVED | $m_4$-$m_9$ |
| AUDIO DATA | FILE SIZE <10 KBYTES | - | $a_0$ |
| | FILE SEIZE ≧10 KBYTES | FREQUENCY RANGE 1000 Hz TO 3000 Hz | $a_1$ |
| | | FREQUENCY RANGE OTHER THAN THE ABOVE RANGE | $a_2$ |
| | | RESERVED | $a_3$-$a_9$ |

Fig. 9

(IN CASE OF TERMINAL WITH PERIPHERAL DEVICE)

| CONTENT DATA CATEGORY ID | PERIPHERAL DEVICE |
|---|---|
| $c_0-c_9, s_0-s_9, m_0-m_9, a_0-a_9$ | NO DESIGNATION (ENTIRELY PROCESSED IN PORTABLE TERMINAL) |

Fig. 10

(IN CASE OF TERMINAL WITH ONLY IMAGE VIEWER)

| CONTENT DATA CATEGORY ID | PERIPHERAL DEVICE |
|---|---|
| $c_0-c_9, s_0, a_0-a_9$ | NO DESIGNATION (ENTIRELY PROCESSED IN PORTABLE TERMINAL) |
| $s_1-s_9, m_0-m_9$ | IMAGE VIEWER |

Fig. 11

(IN CASE OF TERMINAL WITH IMAGE VIEWER AND AUDIO UNIT)

| CONTENT DATA CATEGORY ID | PERIPHERAL DEVICE |
|---|---|
| $c_0-c_9, s_0, a_0$ | NO DESIGNATION (ENTIRELY PROCESSED IN PORTABLE TERMINAL) |
| $s_1-s_9, m_0-m_9$ | IMAGE VIEWER |
| $a_1-a_9$ | AUDIO UNIT |

*NEW REGISTRATION* — 235

IT IS POSSIBLE TO REGISTER
A PERIPHERALDEVICE.
PLEASE INPUT THE FIRST
DEVICE NAME AND PUSH ACC KEY.

PLEASE INPUT BRUETOOTH
ADDRESS OF THE FIRST DEVICE
AND PUSH ACC KEY.

PLEASE SELECT A TYPE OF
DATA TO BE MANIPULATED
BY THE FIRST DEVICE.

TEXT DATA
STILL IMAGE (< 1 KB)

INFORMATION PROCESSING TERMINAL AND CONTENT DATA ACQUIRING SYSTEM USING THE SAME

BACKGROUND OF THE INVENTION

1. Field of the Invention

The present invention relates to a portable terminal such as PHS (Personal Handyphone System), a portable telephone and an information processing terminal such as a desktop type computer and a content data acquiring system using these terminals, and particularly to an information processing terminal and a content data acquiring systems adaptive for acquiring content data such as various music or image.

2. Conventional Technique

With spread of portable terminals such as a PHS or a portable telephone, transmission rate of data and quality of communication due to radio have been improved. The PHS and portable telephone mainly functions as a telephone set in the beginning and have been recently highly improved in functions. That is, these portable terminals can handle E-mail and access the Internet as an ordinary computer arranged in a home or an office.

There is a reasonable restriction that the size of the portable terminal must be a portable size. Therefore, the processing speed of CPU (Central Processing Unit) is limited in relation with batteries to be carried. Since various components must be arranged within a little volume, the mount of storage is limited and a mass storage cannot be used. The size of a display screen and the size of a speaker for sound output are also largely limited based on same reason. Therefore, it is attempted to substantially improve the functions of the portable terminal by transferring load of data processing on the side of the portable terminal to another device with reference to CPU or memory described above. One of the attempts is WAP (wireless application protocol) which is a protocol for obtaining Internet information from the portable telephone or the portable information terminal by radio.

FIG. 1 is schematic view of a communication system using WAP. A content data server 102 storing various content data and a WAP gateway 103 are connected with the Internet network 101. In such a communication system, when the portable terminal 104 requests acquisition of content data allocated to a predetermined URL (uniform resource locator) from the content data server 102, data described by HTTP (hypertext transfer protocol) is transmitted to the WAP gateway 103. In the WAP gateway 103, the size of characters of the content data and a location where an image is displayed are calculated and the image is displayed for each page. Data of each screen is transmitted to the portable terminal 104 as binary data. Accordingly, when the WAP is used, since a displaying process to be carried out primarily on the side of the portable terminal 104 is carried out on the side of the WAP gateway 103, the load of a CPU can be reduced. Further, here, an image process concerning picture display is described. However, voice data can be also transmitted to the portable terminal 104 after a decrypting process on the side of the WAP gateway 103. Consequently, the output of video or sound can be carried out freely.

In this way, if a supplementary circuit or device represented by the WAP is used, the portable terminal 104 can expand the range of data for reproduction. However, as described above, mounting of output devices for reproduction of image or sound in the portable terminal 104 is limited due to limitation of the outer shape. Accordingly, there is a problem that even if the function for reproduction is improved, the improved function cannot be fully used.

In an example, it is supposed that the portable terminal 104 can receive sound data in an MPEG (Moving Picture Experts Group) format, and reproduce sound in a predetermined frequency range in a stereophonic form. In this case, however, most portable terminal 104 can contain only a single small speaker. Accordingly, sound cannot be reproduce stereophonically. Moreover, even if downloaded sound data is high quality sound, it is impossible to output sound so as to generate high quality sound. Therefore, when content data is acquired from the content data server 102, data property such as sound quality is checked, and then a peripheral device adaptive for the property is connected with the portable terminal 104 for the reproduction. In the foregoing example, if the portable terminal 104 is provided with line output terminals, an amplifier is connected with the line output terminals to amplify audio output stereophonically and a couple of speakers are connected with the amplifier to reproduce music. However, for this purpose, it is necessary to select peripheral device after the check of the acquired data, and this is complicate. In addition, there is a problem that only a person having specialized knowledge can select the peripheral device corresponding to content data, and it is not economic if people buy unnecessarily expensive device.

The portable terminal is described as the example hereinbefore. However, there is a same problem with respect to a computer such as a laptop computer or desktop computer for office use or home use in relation to the physical size and quality of content data, for example. In case of most laptop computers or wearable computers, enough sound quality or resolution of image cannot be obtained almost. In case of the computers such as a desktop computer, the same problem is caused more or less as the quality of content data is improved.

In conjunction with the above description, a data delivery system is disclosed in Japanese Laid Open Patent Application (JP-A-Heisei 11-136365). In this reference, the system is composed of a communication provider system for delivering various data to a user, an end user terminal for receiving and storing the data delivered from the content data provider system, and a communication network for transferring data between the communication provider system and the end user terminal. The communication provider system is composed of a memory section which stores a menu of the data desired by each end user and desired delivery timings of the data. The data is delivered to the end user terminal at the desired delivery timings based on the data registered on the memory means. The end user terminal receives the data delivered from the communication provider system, stores in order in a memory provided for the end user terminal, and outputs the stored data in accordance to an instruction from the end user.

SUMMARY OF THE INVENTION

Therefore, an object of the present invention is to provide an information processing terminal which can acquire content data from an Internet server and a WAP server, and a content data acquiring system using the same.

Another object of the present invention is to provide an information processing terminal which can select a peripheral device adaptive for acquired content data, and a content data acquiring system using the same.

Still another object of the present invention is to provide an information processing terminal which can extract an identifier from content data to determine a peripheral device adaptive for the content data, when the content data contains the identifier, and a content data acquiring system using the same.

Yet still another object of the present invention is to provide an information processing terminal which can inquire a peripheral device adaptive for content data to an inquiry server, and a content data acquiring system using the same.

It is an object of the present invention to provide an information processing terminal which can select a peripheral device corresponding to content data and a content data acquiring system using the same.

In an aspect of the present invention, a content data acquiring system includes a portable terminal, a gateway, a first server and a second server. The portable terminal issues a content data request for content data desired by a user, and receives a desired content data file to reproduce the desired content data from the desired content data file. The first server is provided on a first network and can provide first content data files written in a first language. The first server transmits a desired one of the first content data files via the first network in response to the content data request when the content data request is destined to the first server. The second server is provided on a second network as the Internet and can provide second content data files written in a HTML (hypertext markup language) language. The first language is different from the HTML language. The second server transmits desired one of the second content data files via the second network when the content data request is destined to the second server. The gateway is operatively connected with the portable terminal and the first and second servers, and transfers the content data request from the portable terminal to the first or second server based on the content data request, and transfers the desired content data file from the first or second server to the portable terminal.

Here, the first server may be a WAP (wireless access protocol) server, the first language may be WML (wireless markup language) language, and the first network may be a WAP network.

Also, the portable terminal may be a portable phone or a portable computer.

Also, the gateway is composed of a base station and a control unit. The base station transfers the content data request from the portable terminal, and transfer the desired content data file to the portable terminal. The control unit transfers the content data request transferred from the base station to the first or second server based on the content data request, and transfers the desired content data file to the base station. The control unit may include a WML converting section and a data converting section. The WML converting section converts the desired content data file having a HTML data format and transmitted from the second server to have a WML data format. Also, the WML converting section converts the content data request having a WAP data format and transmitted from the base station to have an HTML data format and transmits the content data request having the HTML data format to the second server based on the content data request. The data converting section converts the desired content data file having the WML data format and transmitted from the first server or the WML converting section to have a WAP data format and transmits the desired content data file to the base station. Also, the data converting section converts the content data request having the WAP data format and transmitted from the base station to have the WML data format and transmits the content data request having the WML format to the first server based on the content data request.

Also, the desired content data file includes an identifier indicating a category of the desired content data file. In this case, the desired content data file may be classified into the category based on a size of the desired content data file, or based on a file format of the desired content data file.

Also, the content data acquiring system may further include a peripheral device corresponding to the identifier. The portable terminal transmits the desired content data file to the peripheral device such that the peripheral device reproduces the desired content data from the desired content data file.

Also, the content data acquiring system may further include a plurality of peripheral devices respectively allocated with identifiers which are different from each other. The portable terminal may include a storage section which stores relations of one identifier and one peripheral device and a control section. The control section extracts at least an identifier from the desired content data file, determines whether the extracted at least an identifier is stored in the storage section. Then, the control section transmits the desired content data file to at least one of the plurality of peripheral devices corresponding to the extracted at least an identifier such that the at least one peripheral device reproduces the desired content data from the desired content data file, when it is determined that the extracted at least an identifier is stored in the storage section.

Also, the portable terminal transmits the desired content data file to the peripheral device or the at least one of the plurality of peripheral devices through a radio channel.

In this case, the portable terminal reproduces the desired content data from the desired content data file, when it is determined that the extracted at least an identifier is not stored in the storage section. In this case, the portable terminal may further include a display section. In this case, the control section controls the display section to display a menu screen in a peripheral device setting mode, the control section controls the display section to display the stored relations of the identifier and the peripheral device when a confirmation item of the menu screen is selected, and the control section stores a new relation of the identifier and the peripheral device in the storage section when a new registration item of the menu screen is selected. Also, the control section controls the display section to display the relations of the identifier and the peripheral device when a change item of the menu screen is selected, and stores a changed relation of the identifier and the peripheral device in the storage section when the displayed relation is changed, and the control section deletes all the stored relations of the identifier and the peripheral device when a all-deletion item of the menu screen is selected.

Also, the content data acquiring system may further include a plurality of peripheral devices connectable to the portable terminal, and a third server. The third server is provided on the first or second network and transmits information of the most adaptive peripheral device to the portable terminal based on reception data of the plurality of peripheral devices and the identifier corresponding to the desired content data file, when any of the plurality of peripheral devices is adaptive. The portable terminal transmits the reception data to the third server and receives the information of the most adaptive peripheral device and transmits the desired content data file to the most adaptive peripheral device based on the information.

When the portable terminal transmits only the identifier or when there is no adaptive peripheral device in the reception data, the third server transmits a list of adaptive peripheral devices to the portable terminal.

In another aspect, a data processing terminal connectable a plurality of peripheral devices, includes a transmitting section, a receiving section, a storage section, a reproducing section, an interfacing section and a control section. The transmitting section transmits a radio signal to a base station, and the receiving section receives a radio signal from the base station. The storage section stores relations of an identifier and a peripheral device, and the reproducing section can reproduce desired content data from a desired content data file. The interfacing section can transmit and receive a signal, and a control section which controls the transmitting section to transmit a content data request to the base station, and extracts at least an identifier from the desired content data file received by the receiving section in response to the content data request. Also, the control section searches the storage section to determine whether the extracted at least an identifier is stored in the storage section, and transmits the desired content data file to the peripheral device adaptive for the al least an identifier without reproduction of the desired content data by the reproducing section, when it is determined that the extracted at least an identifier is stored in the storage section.

Also, the control section may control the reproducing section to reproduce the desired content data from the desired content data file when it is determined that the extracted at least an identifier is not stored in the storage section.

Also, the interfacing section may be detachable. Also, the interfacing section transmits the desired content data file to the adaptive peripheral device through a radio channel.

Also, the identifier may indicate a category of the desired content data file. In this case, the desired content data file may be classified into the category based on a size of the desired content data file, or based on a file format of the desired content data file.

Also, the data processing terminal may have a portable phone function.

Also, the control section controls a display section of the reproducing section to display a menu screen in a peripheral device setting mode, and control the display section to display the stored relations of the identifier and the peripheral device when a confirmation item of the menu screen is selected. Also, the control section may store a new relation of the identifier and the peripheral device in the storage section when a new registration item of the menu screen is selected, and the new relation is inputted. Also, the control section may control the display section to display the relations of the identifier and the peripheral device when a change item of the menu screen is selected, and may store a changed relation of the identifier and the peripheral device in the storage section when the displayed relation is changed, and the control section may delete all the stored relations of the identifier and the peripheral device when a all-deletion item of the menu screen is selected.

In this case, the control section may transmit device data indicating the peripheral devices connected to the data processing terminal an inquiry server and may receive information of the most adaptive peripheral device in response to the device data. Also, the control section may transmit the desired content data file to the most adaptive peripheral device based on the information.

In still another aspect, a content data acquiring system includes a peripheral device corresponding to an identifier, a portable terminal, a gateway and a server. The portable terminal issues a content data request for content data desired by a user, and receives a desired content data file to extract the identifier from the desired content data file and controls the peripheral device to reproduce the desired content data from the desired content data file. The server is provided on a network and which transmits a desired content data file via the network in response to the content data request. The gateway is connected to the parable terminal and the server and transfers the content data request from the portable terminal to the server, and transfers the desired content data file from the server to the portable terminal.

Also, the server may be a WAP (wireless access protocol) server, the desired content data file may be written in a WML (wireless markup language) language, and the network may be a WAP network. In this case, the control unit may include a data converting section which converts the desired content data file having the WML data format and transmitted from the server to have a WAP data format and transmits the desired content data file having the WAP data format to the base station, and converts the content data request having the WAP data format and transmitted from the base station to have the WML data format and transmits the content data request having the WML format to the server based on the content data request.

Also, the server may be an Internet server, the desired content data file may be written in an HTML (Hypertext markup language) language, and the network may be the Internet.

In this case, the gateway is composed of a base station and a gateway control unit. The base station transfers the content data request from the portable terminal, and transfers the desired content data file to the portable terminal. The gateway control unit transfers the content data request transferred from the base station to the server, and transfers the desired content data file from the server to the base station. The gateway control unit may include a converting section which converts the desired content data file having a HTML data format and transmitted from the server to have a WML data format, converts the desired content data file having the WML data format to have a WAP data format and transmits the desired content data file having the WAP data format to the base station, and converts the content data request having the WAP data format and transmitted from the base station to have an HTML data format and transmits the content data request having the HTML data format to the server based on the content data request.

Also, the portable terminal may be a portable phone, or a portable computer.

Also, the desired content data file may be classified to have the identifier based on a size of the desired content data file, or based on a file format of the desired content data file.

Also, the content data acquiring system may further include a plurality of peripheral devices connectable to the portable terminal, and an inquiry server. The inquiry server may be provided on the network and may transmit information of peripheral device the most adaptive for reproduction of the desired content data to the portable terminal based on device data of the plurality of peripheral devices and the identifier extracted from the desired content data file, when any of the plurality of peripheral devices is adaptive. The portable terminal may transmit the device data to the inquiry server and receives the information of the most adaptive peripheral device and transmits the desired content data file to the most adaptive peripheral device based on the information. In this case, when the portable terminal transmits only the identifier or when there is no adaptive peripheral device in the device data, the inquiry server may transmit a list of adaptive peripheral devices to the portable terminal.

BRIEF DESCRIPTION OF THE DRAWINGS

FIG. 8 is a diagram showing categories of content data used in the content data acquiring system in the embodiment.

FIG. 9 is a diagram showing an example of relations of an identifier and a peripheral device usable by the portable terminal;

FIG. 10 is a diagram showing another example of relations of an identifier and a peripheral device usable by the portable terminal;

FIG. 11 is a diagram showing another example of relations of an identifier and a peripheral device usable by the portable terminal;

DESCRIPTION OF THE PREFERRED EMBODIMENTS

Hereinafter, a portable terminal as a data processing terminal and a content data acquiring system of the present invention will be described below in detail with reference to the attached drawings.

Figure 2:
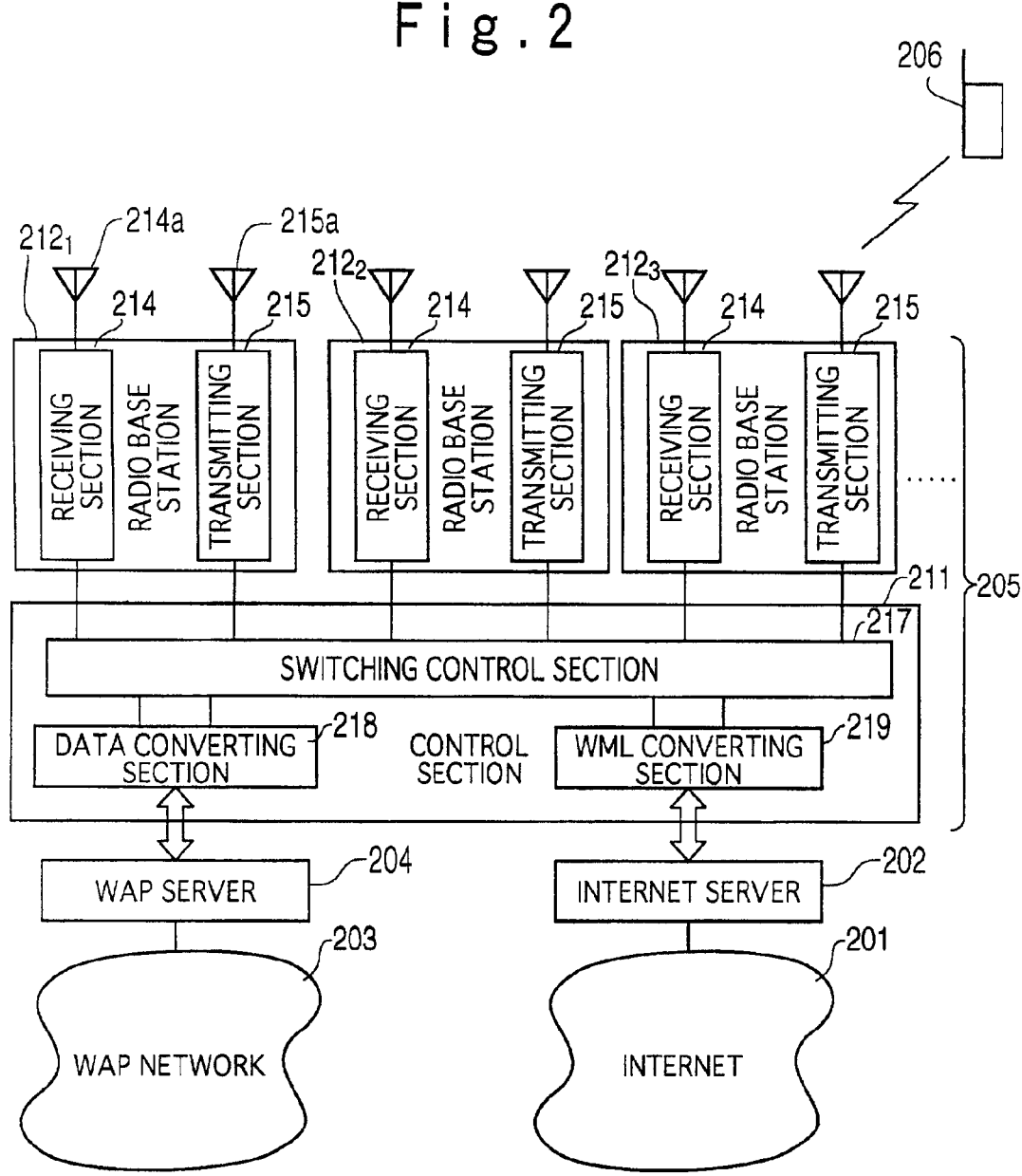
FIG. 2 is a diagram showing the system configuration of a content data acquiring system according to a first embodiment of the present invention.

FIG. 2 shows the main portion of a content data acquiring system according to a first embodiment of the present invention. The content data acquiring system is composed of an internet server 202 connected with the Internet 201, a WAP server 204 connected with a WAP network 203, a WAP gateway 205 connected with the internet server 202 and the WAP server 204 and a portable terminal 206 communicating with the WAP gateway 205 on a radio. The WAP gateway 205 is composed of a control section 211 and a plurality of radio base stations $212_1$, $212_2$, ... connected with the control section 211. Also, the portable terminal has a portable phone function and/or a personal computer function.

Figure 1:
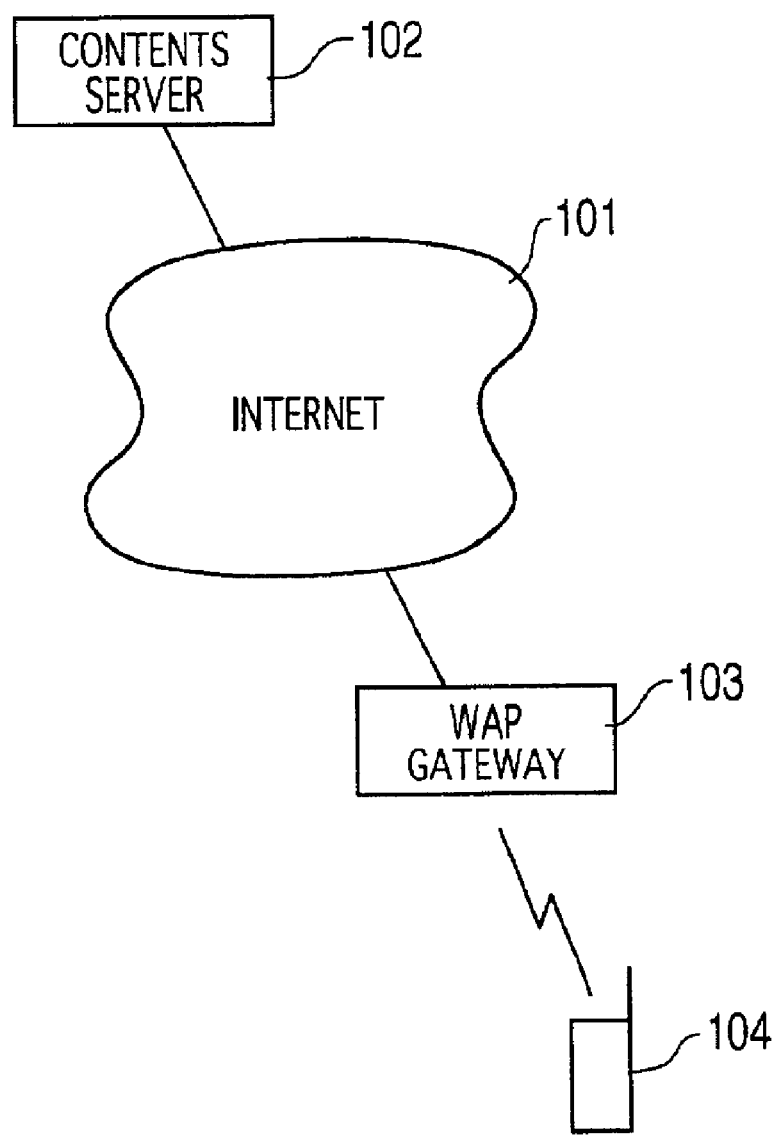
FIG. 1 is a diagram showing the overview of the system configuration a conventional communications system using a WAP server.

Here, the plurality of radio base stations $212_1$, $212_2$, ... basically have same configuration. Each radio base station 212 is composed of a receiving section 214 provided with a receiving antenna 214A for receiving data from the portable terminal 206 (only one antenna is shown in FIG. 1) and a transmitting section 215 provided with a transmitting antenna 215A for transmitting data to the portable terminal 206. The radio base stations $212_1$, $212_2$, ... are connected with a switching control section 217 provided in the control section 211. Further, these stations are connected with the WAP server 204 through a data converting section 218 and with the Internet server 202 through a WML converting section 219.

The WAP server 204 is the server which contains content data described in a WML (Wireless Markup Language) language, which is determined in WAP Forum as a content data description language for a portable terminal. The WAP server 204 is connected with a WAP network 203 for a server containing content data described in such a WML. On the other hand, the Internet server 202 contains content data described in a HTML (Hypertext markup language) language and is similarly connected with the Internet network 201 together with servers (not shown).

When the portable terminal 206 receives delivery of content data from the WAP server 204, the data converting section 218 encodes the content data described in the WML language into WAP data which is binary data, to transfers to the switching control section 217. Further, the WAP data transmitted from the portable terminal 206 to the switching control section 217 is decoded to be transmitted to the WAP server 204.

On the other hand, the Internet server 202 is the server which contains content data described in the HTML language. In case of a computer for business use or home use (not shown) connected with the Internet network 201, the computer directly acquires and interprets content data described in the HTML language. Thus, the content data can be displayed as image or outputted as sound. In case of the portable terminal 206 represented by a portable telephone in the invention, it is necessary to receive the content data after conversion of the content data described in the HTML language into WAP data. Therefore, the content data acquired from the Internet server 202 are transferred to the WML converting section 219 to convert into the WML description. The content data converted into the WML description are transferred to the data converting section 218 through the switching control section 217 to convert into WAP data as described above. Then, the WAP data is transmitted from the switching control section 217 to the portable terminal 206 through a corresponding one of the plurality of radio base stations $212_1$, $212_2$, . . . .

Conversely, the WAP data transmitted from the portable terminal 206 to the radio base stations 212 is converted into the HTML description in the WML converting section 219, and transmitted to the internet server 202 or the WAP server 204 through the data converting section 218.

In this way, in the content data acquiring system of the invention, two kinds of servers of the WAP server 204 and the internet server 202 are provided as the servers from which the portable terminal 206 can receive delivery of content data. When the address specified as the server from which the portable terminal 206 can receive the delivery of content data indicates the WAP server 204, the switching control section 217 transfers the data to the WAP server 204. When the address specified as the server from which the portable terminal 206 can receive the delivery of content data indicates the Internet server 202, the data converted by the WML converting section 219 is transmitted to the Internet server 202. In addition, usual computers (not shown) such as a desktop type computer are also connected with the Internet server 202. In this case, of course, the computer is connected with the Internet server 202 not through the WAP gateway 205.

Figure 3:
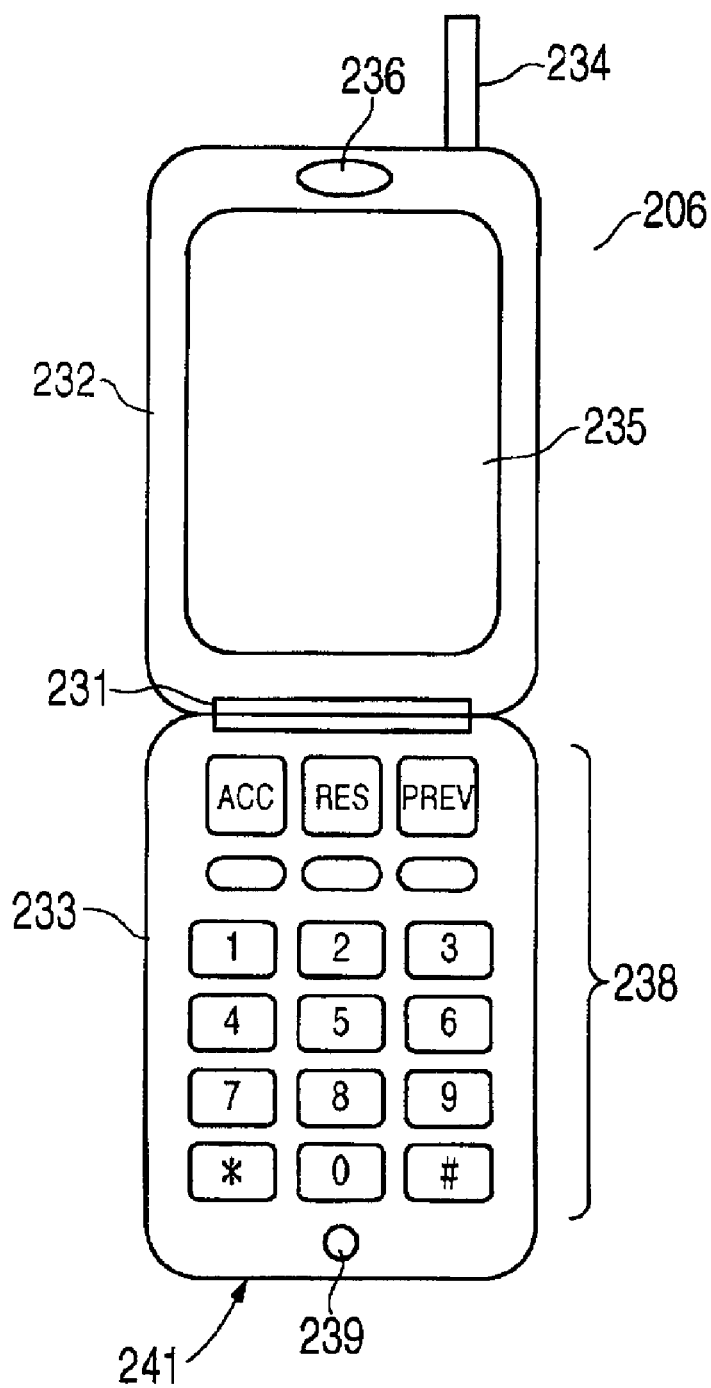
FIG. 3 is a plan view showing the outward appearance of a portable terminal used in the first embodiment.

FIG. 3 shows the appearance of one example of the portable terminal used in the embodiment. In the portable terminal 206, an uppercasing 232 and a lowercasing 233 can be folded in a center portion on a hinge mechanism 231. An antenna 234 is projected from the tip of the upper casing 232, and a display section 235 composed of a liquid crystal display is arranged on an inside surface of the upper casing 232. A speaker 236 is arranged above the display section 235. An input section 238 and a microphone 239 are arranged on an inside surface of the lower casing 233. An insertion port 241 for a card is provided at the bottom of the lower casing 233. An interface card for radio communication is inserted into this port.

Here, the input section 238 is a portion which is composed of various keys such as ten-key for input of various data such as dial information in the portable terminal 206. The display section 235 is a portion which displays an image, like the liquid crystal display.

Figure 4:
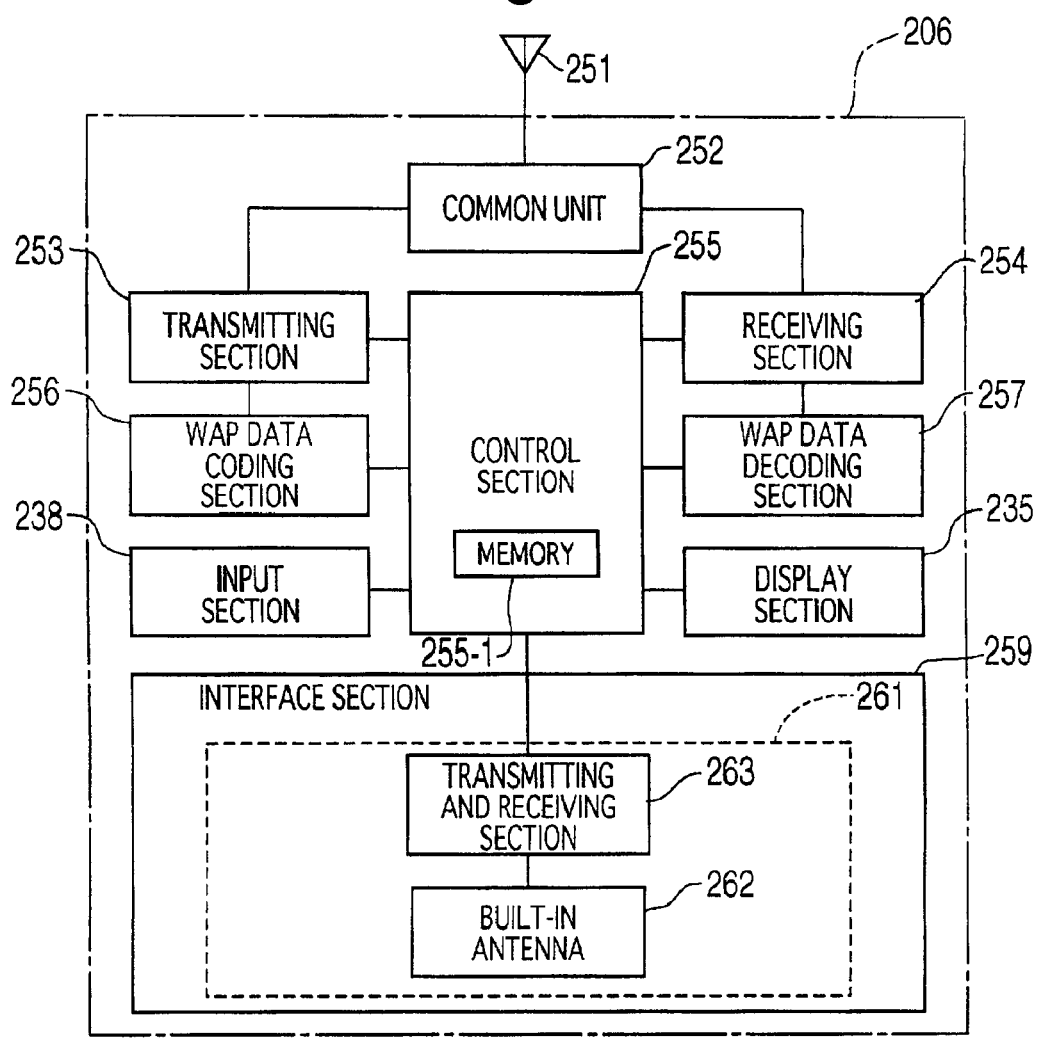
FIG. 4 is a block diagram showing the circuit structure of the portable terminal in the first embodiment.

FIG. 4 shows a circuit structure of the portable terminal 206. The portable terminal 206 is provided with an antenna 251, a transmitting section 253 and a receiving section 254 mutually connected via a duplexer 252 for switching the antenna 251. The transmitting section 253 is connected with a control section 255 collectively controlling the portable terminal 206, and with a WAP data encoder 256 for encoding WAP data. The control section 255 is provided with a CPU (not shown) and carries out predetermined various controls in accordance with a program stored in a ROM (Read Only Memory: not shown). The control section 255 has a memory 255-1 which stores the relations of an identifier and a peripheral device for reproduction of desired content data. The control section 255 is connected with the transmitting section 253, the WAP data encoder 256, the receiving section 254, a WAP data decoder 257 decoding the WAP data, the display section 235 and the speaker 236 (shown in FIG. 3) as units for reproduction of the content data file and the input section 238 (shown in FIG. 3) and controls these sections. The control section 255 is also connected with an interface section 259.

The interface card 261 described in FIG. 4 is detachable and attached to the interface section 259. The interface card 261 is a card for Bluetooth and contains a built-in antenna 262 and a transmitter-receiver section 263 for transmitting and receiving data to and from a peripheral device (not shown) through the built-in antenna 262. Furthermore, the portable terminal 206 may be fixedly provided with the built-in antenna 262 and the transmitter-receiver section 263 instead of above-described interface card 261.

The WAP data encoder 256 is the circuit for encoding input data into WAP data, and the encoded WAP data is transferred from the transmitting section 253 to the antenna 251 and transmitted to the radio base station 212 (shown in FIG. 2) in charge. The WAP data decoder 257 decodes WAP data received from the antenna 251 to display the data on the display section 235 or to supply the data to the above-described peripheral device through the interface section 259. Since the interface card 261 is provided with the transmitter-receiver section 263, the card may also receive character input information sent from a keyboard (not shown) to display the information on the display section 235 or to transmit input data to the radio base station 212 through the transmitting section 253 and the antenna 251.

Figure 5:
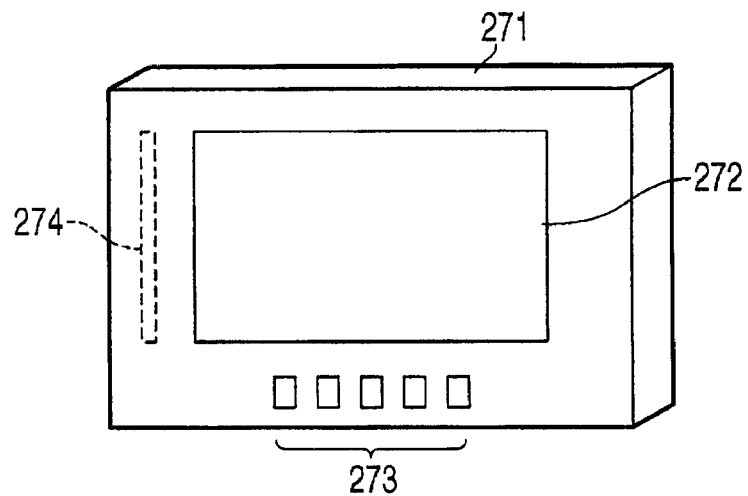
FIG. 5 a perspective view showing the outward appearance of an image viewer as an example of a peripheral device connectable with the portable terminal.

FIG. 5 shows the appearance of an image viewer which is an example of a peripheral device which is connected with the portable terminal 206. The image viewer 271 is a display device which is arranged on a desk and comparatively large-sized, and provided with a display section 272 composed of a color liquid crystal display which is far larger as compared with the display 235 of the portable terminal 206 shown in FIG. 3. In addition, the input section 273 composed of a plurality of key switches for input operation is arranged just below the display section 272. Furthermore, a built-in antenna 274 is accommodated inside the device, thereby the data received from the transmitter-receiver section 263 of the portable terminal 206 described in FIG. 4 can be displayed on the color liquid crystal display 272.

Figure 6:
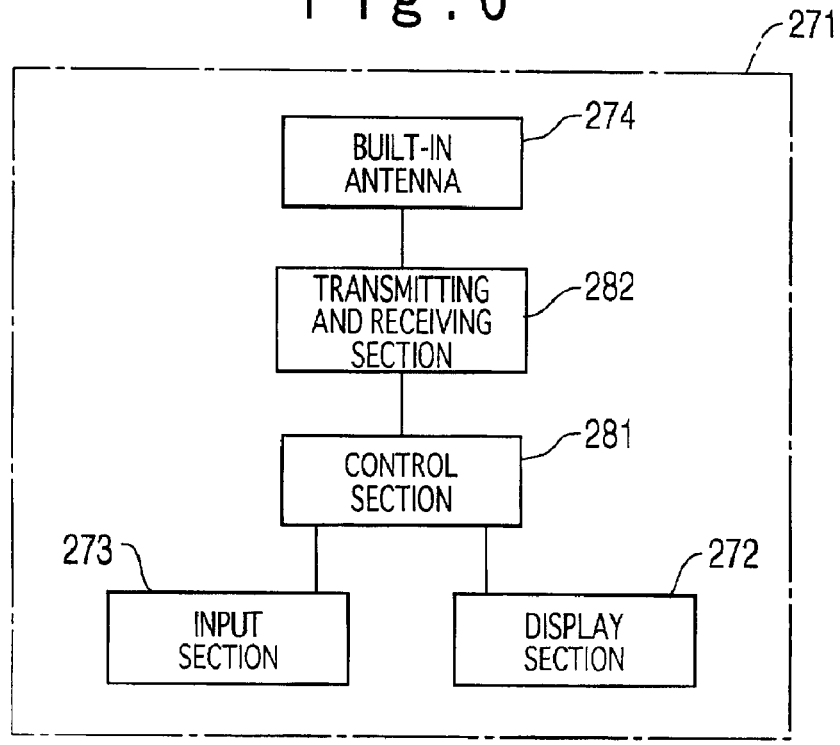
FIG. 6 is a block diagram showing the overview of the circuit structure of the image viewer shown in FIG. 5.

FIG. 6 shows a schematic circuit structure of the image viewer. The image viewer 271 is provided with a control section 281 collectively controlling the device. The control section 281 is provided with a CPU, a ROM and a RAM (Random Access Memory) (not shown) and carries out controls in accordance with a program stored in the ROM. The display section 272, the input section 273 and a transmitter-receiver section 282 are connected with the control section 281. The control section 281 decodes the received data from the built-in antenna 274 to expand the data on a predetermined region of the RAM and displays an image on the display section 272. Further, the input data from the input section 273 or the data stored in the predetermined region of the ROM can be transmitted to the portable terminal 206 (see FIG. 3) from the transmitter-receiver section 282 through the built-in antenna 274 under a specific condition.

Figure 7:
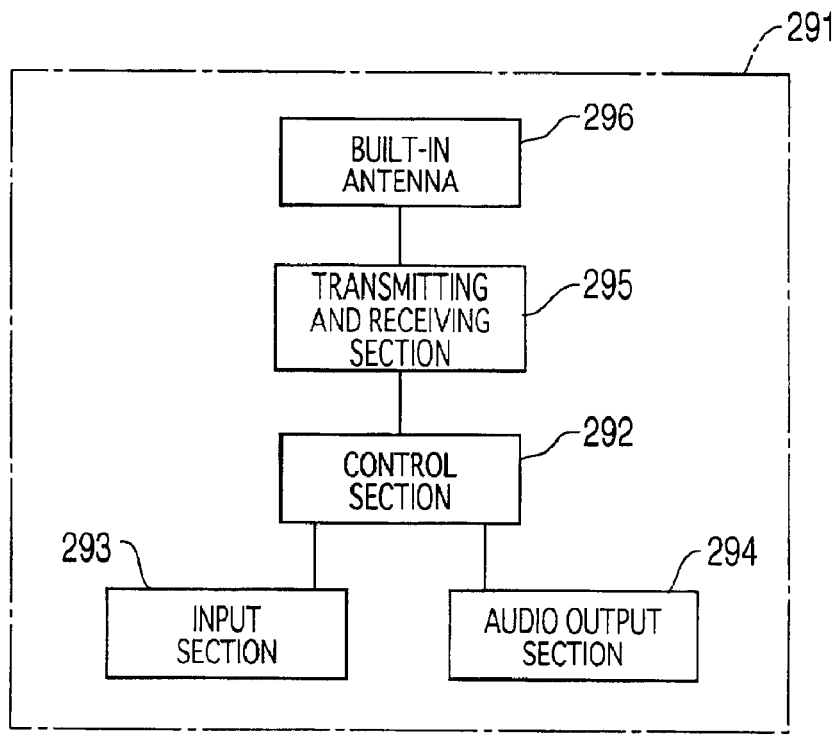
FIG. 7 is a block diagram showing an example of the circuit structure of an audio unit as another example of the peripheral device.

FIG. 7 shows an example of circuit organization of an audio unit which is other example of the peripheral device. This audio unit 291 is provided with a control section 292 like the image viewer 271. The control section 292 is connected with an input section 293 which inputs data, an audio output section 294 composed of an amplifier and speakers (not shown) for audio output and a transmitter-receiver section 295. The transmitter-receiver section 295 is connected with a built-in antenna 296 and reproduces sound from the speakers based on received audio data. The input section 293 is a portion from which data for adjustment of sound volume is inputted, and predetermined data inputted from the input section 293 and data stored in the predetermined region in the ROM are transmitted from the transmitter-receiver section 295 to the portable terminal 206 through the built-in antenna 296 (see FIG. 3) under a specific condition.

FIG. 8 shows a category of content data used in the content data acquiring system of the embodiment. The content data are categorized into a large category, a middle category and a small category. Each category is allocated with an inherent identifier. The portable terminal 206 selects the peripheral device adaptive for reproduction by acquiring the identifier corresponding to the content data to be tried to reproduce. In the embodiment, as shown in the "large category", the content data are categorized into three kinds of data of character data, image data and audio data. The image data are categorized into still image and animation in the middle category. The audio data are categorized into two kinds of data depending on its file size in the middle category. In the small category, its file size is specified about character data and image data, and the file size is categorized by frequency range which may be reproduced in the audio data.

A variety of categorizing techniques exist depending on peripheral devices. For example, the technique shown in FIG. 8 carries out categorizing mainly based on a file size in relation with the storage capacity of the peripheral device which receives the content data and assigns an identifier. In this case, the identifier may be different depending on the file format. For example, in the case of a still image, it is sometimes necessary on selection of the peripheral device to be applied that the identifier is different depending on whether the picture has JPEG (Joint Photographic Experts Group) format or GIF (Graphics Interchange Format) format.

Some examples of reproduction in obtaining various content data using the portable terminal 206 in the content data acquiring system in the embodiment will now be described.

FIG. 9 shows a situation of reproduction in case that the portable terminal 206 has no peripheral device or that the portable terminal 206 is not in environment where peripheral device may be used. In this case, the state of "no designation" is selected about a peripheral device on the side of the portable terminal 206. Accordingly, when content data is acquired including an identifier "$c_0$–$c_9$" corresponding to character data, an identifier "$s_0$–$s_9$" corresponding to a still image, an identifier "$m_0$–$m_9$" corresponding to animation, or an identifier "$a_0$–$a_9$" corresponding to audio data, the reproduction of the acquired data is carried out by means of the display section 235 or the speaker 236 (see FIG. 3) provided in the portable terminal 206 itself.

FIG. 10 shows an example of the state of reproduction in case that the portable terminal 206 has only an image viewer as a peripheral device. For example, when the portable terminal 206 has the image viewer 271 shown in FIG. 5, the image viewer 271 is designated as a peripheral device for the identifier "$s_0$–$s_9$" corresponding to a still image or the identifier "$m_0$–$m_9$" corresponding to animation. Thus, a high quality image can be reproduced. In case of the content data including other identifier data, since the designation of a peripheral device is not carried out, the reproduction is carried out using the portable terminal 206 itself.

FIG. 11 shows an example of the state of reproduction in case that the portable terminal 206 has an image viewer and an audio unit as peripheral devices. For example, when the portable terminal 206 has the image viewer 271 shown in FIG. 5 and the audio unit 291 shown in FIG. 7, the image viewer 271 is designated as the peripheral device for the identifier "$s_0$–$s_9$" corresponding to a still image and the identifier "$m_0$–$m_9$" corresponding to animation. Thus, these data can be reproduced. Also, the audio unit 291 is designated as the peripheral device for the identifier "$a_0$–$a_9$" corresponding to audio data. Thus, the reproduction can be carried out. There is a case in which content data include other identifiers, for example, the content data include the identifier "$c_0$–$c_9$" corresponding to character data, the identifier "$s_0$" corresponding to a still image whose file size is so smaller than 1 Kbyte that the still image can be reproduced fully on the side of the portable terminal 206, and the identifier "$a_0$" corresponding to audio data whose file size is so smaller than 10 Kbytes in which frequency is not limited particularly. In such a case, the reproduction is carried out on the side of the portable terminal 206. In this case, if the image viewer 271 and the audio unit 291 are already connected with the terminal 206, the reproduction can be carried out by use of these devices. However, when a file of a small size is simply reproduced, the reproduction can be carried out conveniently by the portable terminal 206 itself.

Figure 12:
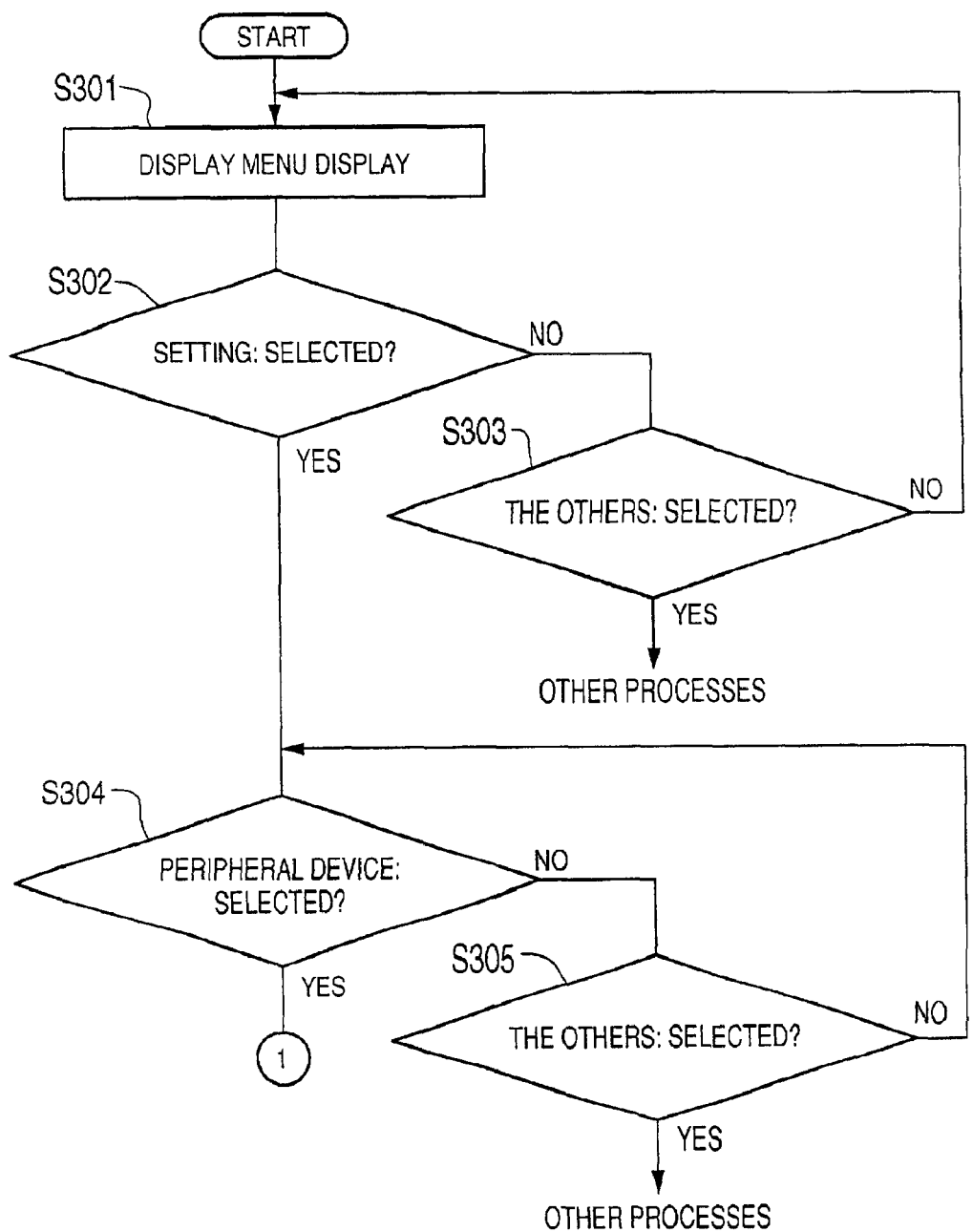
FIGS. 12 and 13 are a flow chart showing a processing flow to set the environment to utilize peripheral devices by the portable terminal in the first embodiment.
Figure 13:
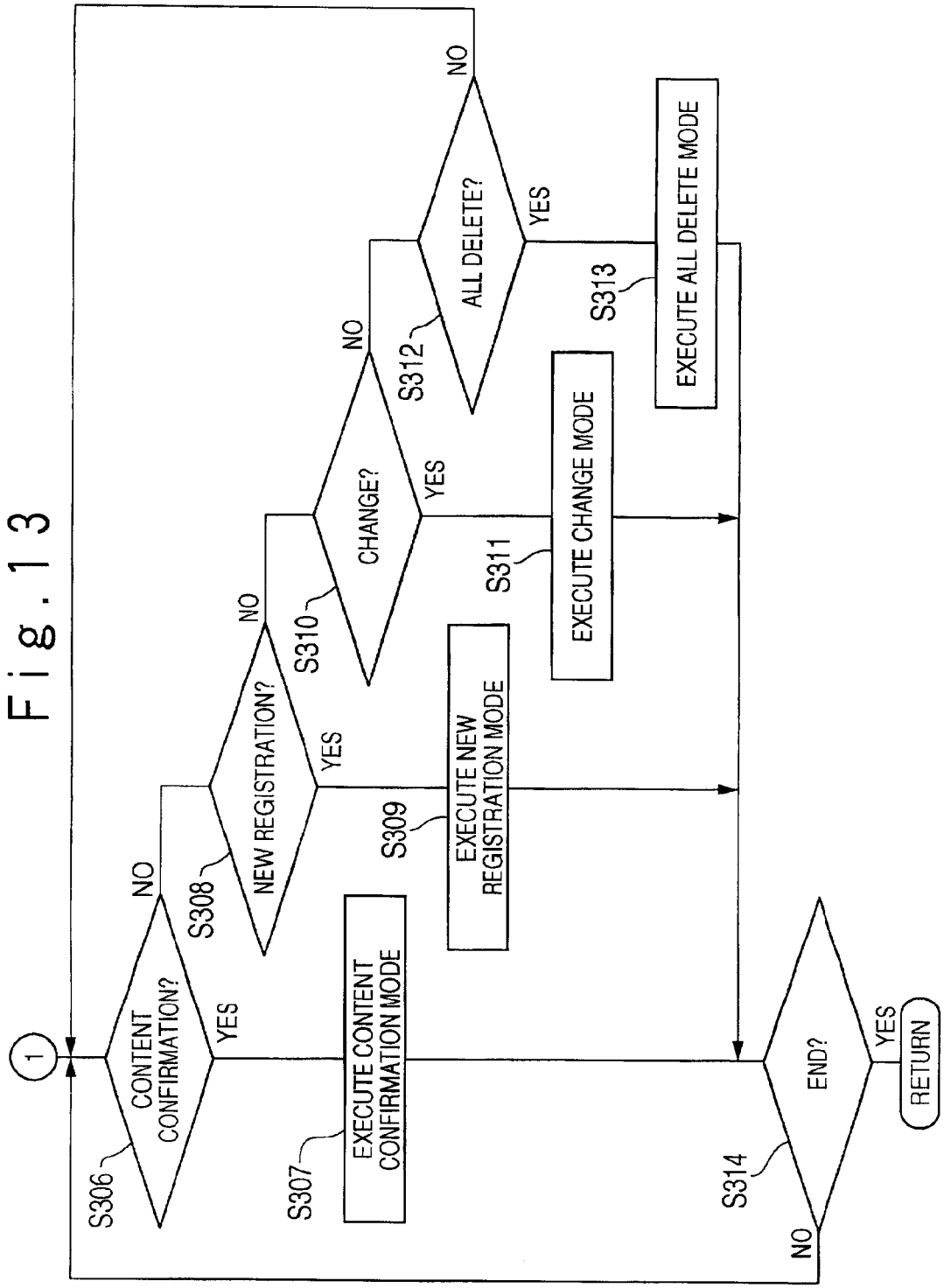

FIG. 12 and FIG. 13 show processing flows for environment setting to utilize a peripheral device for the portable terminal. The CPU in the control section 255 of the portable terminal 206 shown in FIG. 4 carries out such processing based on a program stored in the ROM described above. Thus, when the power source of the portable terminal 206 is turned on, the CPU first displays menu screen on the display section 235 (FIG. 3) (Step S301 in FIG. 12).

Figure 14:
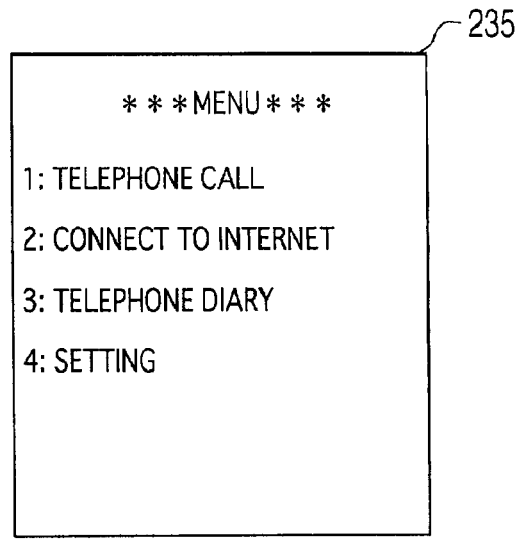
FIG. 14 is a plan view showing an example of a menu screen on a display section of the portable terminal in the first embodiment.

FIG. 14 shows an example of menu screen displayed on the display section of the portable terminal. Here, the items of "telephone call", "internet connection", "telephone directory" and "setting" are displayed together with numbers assigned to the respective items. When the environment of the peripheral device is to be set, thereby the number "4" is selected and inputted through the input section 238 to select the item of "setting" (Step S302 in FIG. 12). When another number is selected (Step S302; N, Step S303; Y in FIG. 12), the control operation progresses for item corresponding to each number. However, description in this case is omitted since the description is independent of the invention.

Figure 15:
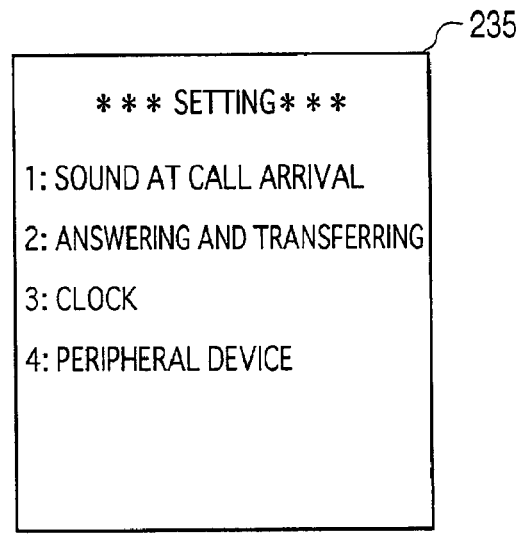
FIG. 15 is a plan view showing a menu screen on the display section of the portable terminal when an item "setting" is selected from the menu screen in the first embodiment.

FIG. 15 shows a menu display when the item of "setting" is selected from the menu screen. Here, the items of "call arrival sound", "automatic answering telephone and transfer", "clock" and "peripheral device" are displayed together with numbers assigned to the respective items. In this case, since the setting of a peripheral device is carried out, the number "4" is selected and inputted through the input section 238 (Step S304 in FIG. 12). When another number is selected (Step S304; N, Step S305; Y in FIG. 12), the operation progresses for the item corresponding to each number. However, description in this case is also omitted since the description is independent of the invention.

Figure 16:
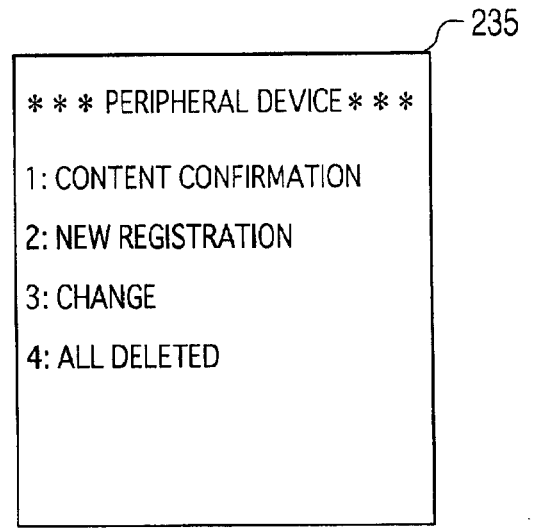
FIG. 16 is a plan view showing a menu screen on the display section of the portable terminal when an item "peripheral device" is selected in the first embodiment.

FIG. 16 shows a menu display when the item of "peripheral device" is selected. Here, the items of "content data confirmation", "new registration", "change" and "all deletion" are displayed together with numbers assigned to the respective items. The item of "content data confirmation" is a mode for confirmation of currently set peripheral devices in the memory 255-1, and the item of "new registration" is a mode for newly registering a peripheral device in the memory 255-1. The item of "change" is a mode for changing content data registered in the memory 225-1, and the item of "all deletion" is a mode for deleting all content data registered in the memory 255-1. When the "content data confirmation" is to be carried out (Step S306; Y in FIG. 13), the number of "1" is selected and inputted through the input section 238. Therefore, the mode of the content data confirmation is set (Step S307 in FIG. 13). When new registration of a peripheral device is to be carried out (Step S306; N, Step S308; Y in FIG. 13), the number of "2" is selected and inputted through the input section 238. Therefore, the mode of new registration is set (Step S309 in FIG. 13). When the change of a peripheral device is to be carried out (Step S308; N, Step S310; Y in FIG. 13), the number of "3" is selected and inputted through the input section 238. Therefore, the mode of change is set (Step S311 in FIG. 13). When all deletion of peripheral devices is to carried out (Step S310; N, Step S312; Y in FIG. 13), the number of "4" is selected and inputted through the input section 238. Therefore, the mode of all deletion is set (Step S313 in FIG. 13).

After each mode is set so that the operation in the mode is carried out, a question display is displayed to indicate whether the operation is ended (Step S314 in FIG. 13). For example, when the operation such as new registration or change of a peripheral device is continued, the item of "continue" is selected (N). In this case, the control operation returns to the Step S306, the selecting operation can be carried out the operation for the peripheral device. When the item of "end of operation" is selected, the control operation returns to the menu display as the initial display again (Step S301 in FIG. 12).

Figure 17:
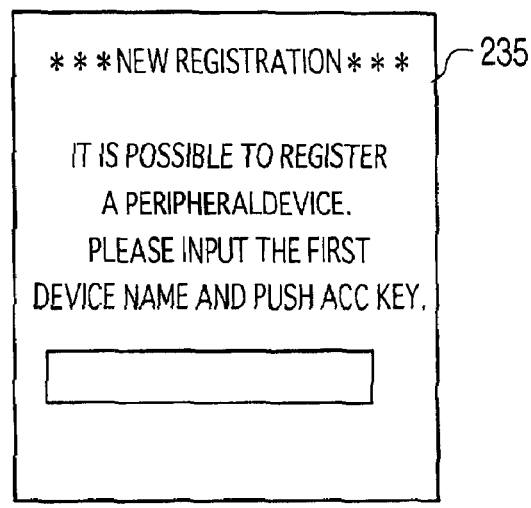
FIG. 17 is a plan view showing a guidance on the display section of the portable terminal displayed when a new registration mode is selected in the first embodiment.

FIG. 17 shows a display when the mode of new registration is selected. First, the input section 238 of the portable terminal shown in FIG. 3 is operated to input a name of a peripheral device to be registered. The name may be so optional that the peripheral device to be registered is related to the name such as a pet name. A key of "ACC" in the input section 238 is operated after the input of the name.

Figure 18:
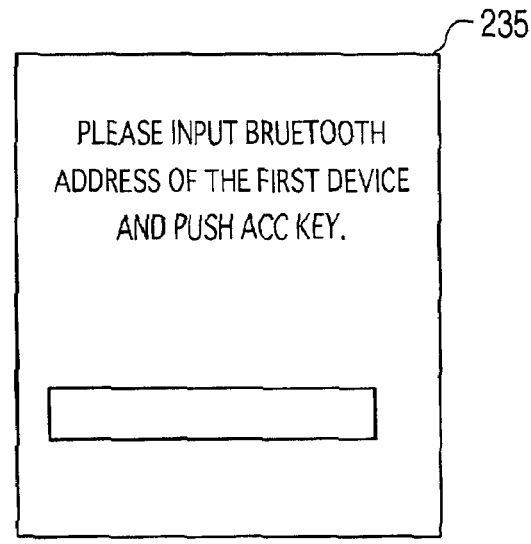
FIG. 18 is a plan view showing a guidance on the display section of the portable terminal displayed when the input of the name of a peripheral device to be newly registered is ended in the first embodiment.

FIG. 18 shows a guidance display when the input operation of the name of the peripheral device to be newly registered is ended. An instruction or guidance is displayed to indicate input of the address of the first peripheral device for Bluetooth specification on the display section 235. Then, the Bluetooth address of the peripheral device to be newly registered is inputted and the key of "ACC" is operated.

Figure 19:
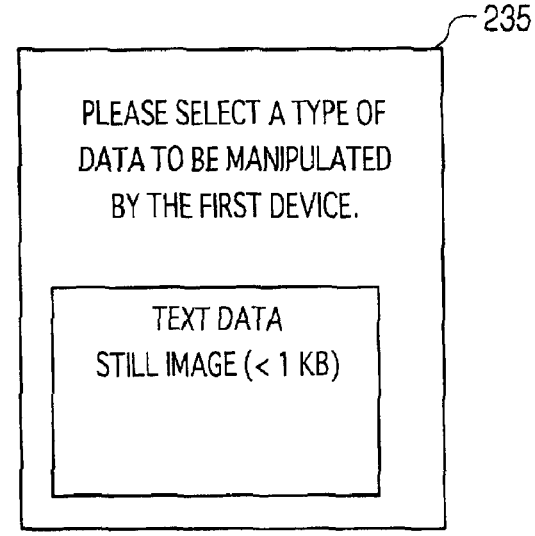
FIG. 19 is a plan view showing a guidance on the display section of the portable terminal displayed when the input of a Bluetooth address is ended in the first embodiment.

FIG. 19 shows a screen display when the input operation of the Bluetooth address is ended. The categories corresponding to classifications shown in FIG. 8 are allowed to scroll-displayed on the display section 235. Therefore, one desired category is selected (even a plurality of categories are allowed). In this way, the registration operation of data to be reproduced using the new peripheral device is ended. Hereinafter, the data of the selected category is transmitted to registered peripheral device and then reproduction of data is carried out by the registered peripheral device. In addition, when a plurality of peripheral devices are registered continuously, an input operation is carried out for continuity of the registration operation (Step S314; N), as described in FIG. 13. Then, the item of "new registration" is selected again (Step S308; Y). Thus, the new registration of another peripheral device can be carried out continuously.

In the embodiment, the portable terminal 206 is connected with each peripheral device to carry out a radio system data transfer of 2.4 GHz and max 1 Mbps (megabit/sec.) specified in the Bluetooth specification. Thus, when the portable terminal 206 receives content data from the Internet server 202 or the WAP server 204 through the radio base station 212 shown in FIG. 2, the terminal 206 extracts the identifier previously incorporated in the content data. In case of existence of the registered peripheral device corresponding to the identifier, data (file) is transmitted to the peripheral device. Thus, higher quality data reproduction can be attained by the peripheral device (see FIG. 10 and FIG. 11).

In case of the terminal 206 in which no peripheral device is not registered, the received data is reproduced by use of the sections provided in the terminal 206, as described in FIG. 9. Accordingly, in case of a file having a special data format (for example, audio data of stereo music or color image data in case that the display section 235 can display only a black-and-white image), sometimes the reproduction of data is limited, or sometimes the data cannot be reproduced when the terminal 206 cannot manipulate the data having the special file form.

Figure 20:
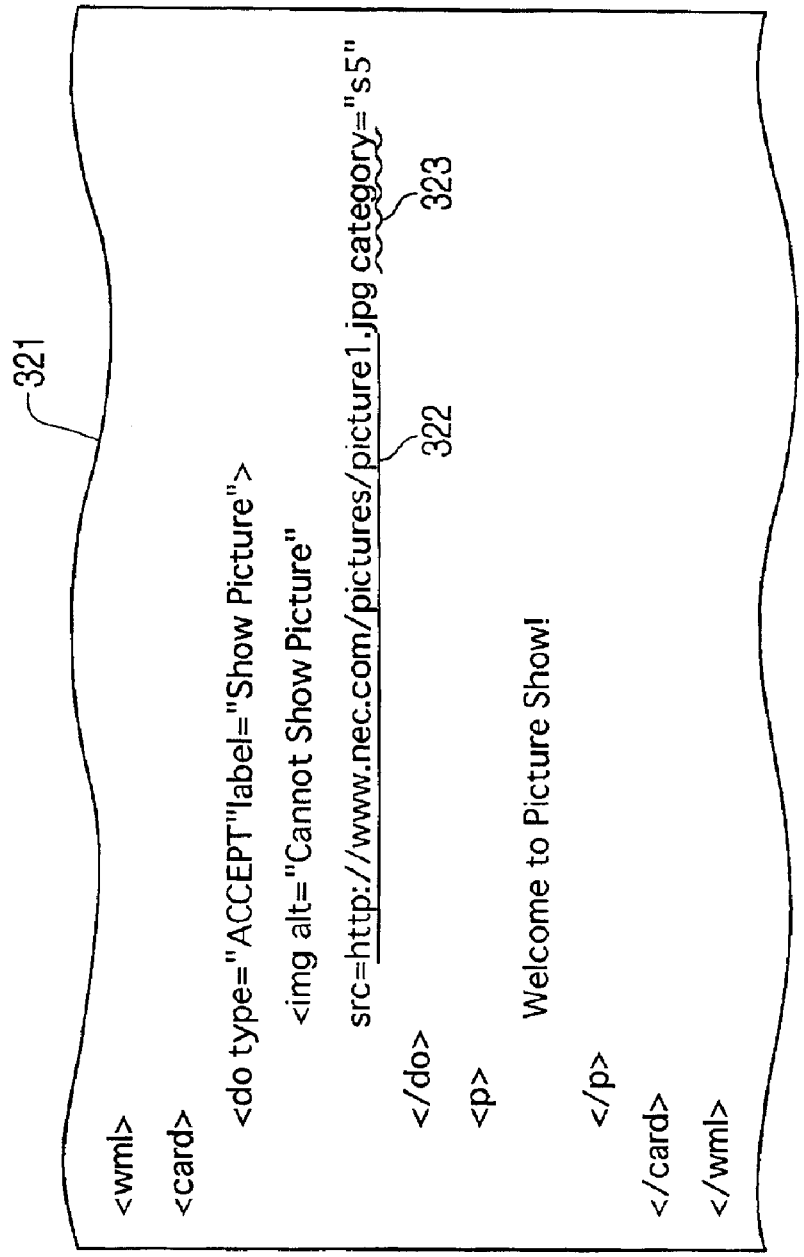
FIG. 20 is a diagram showing a main section of a description sentence described in WML of content data with an identifier incorporated in the first embodiment of the content data acquiring system.

FIG. 20 shows a main portion of a description text described in the WML (wireless markup language) language in the content data having the identifier incorporated in the content data acquiring system according to the present invention, which receives the content data through the WAP gateway. In the description text 321, when a portion 322 of URL shown by underline is accessed in the portable terminal 206, a character string of "Welcome to Picture Show!" is displayed on the display section 235. When a user looks at this display to press the ACC key of the terminal 206, an image file having the file name of "picture1.jpg" which exists on "http://WWW.nec.com/pictures/" is downloaded. It should be noted that the "category" 323 indicating an identifier of the file in the description text 321 is a parameter which is newly set to realize the content data acquiring system in the embodiment. The portable terminal 206 specifies a peripheral device for reproduction by downloading image file having the file name of "picture1.jpg" and recognizing the identifier specified by the "category" 323.

Modification of the Invention

Figure 21:
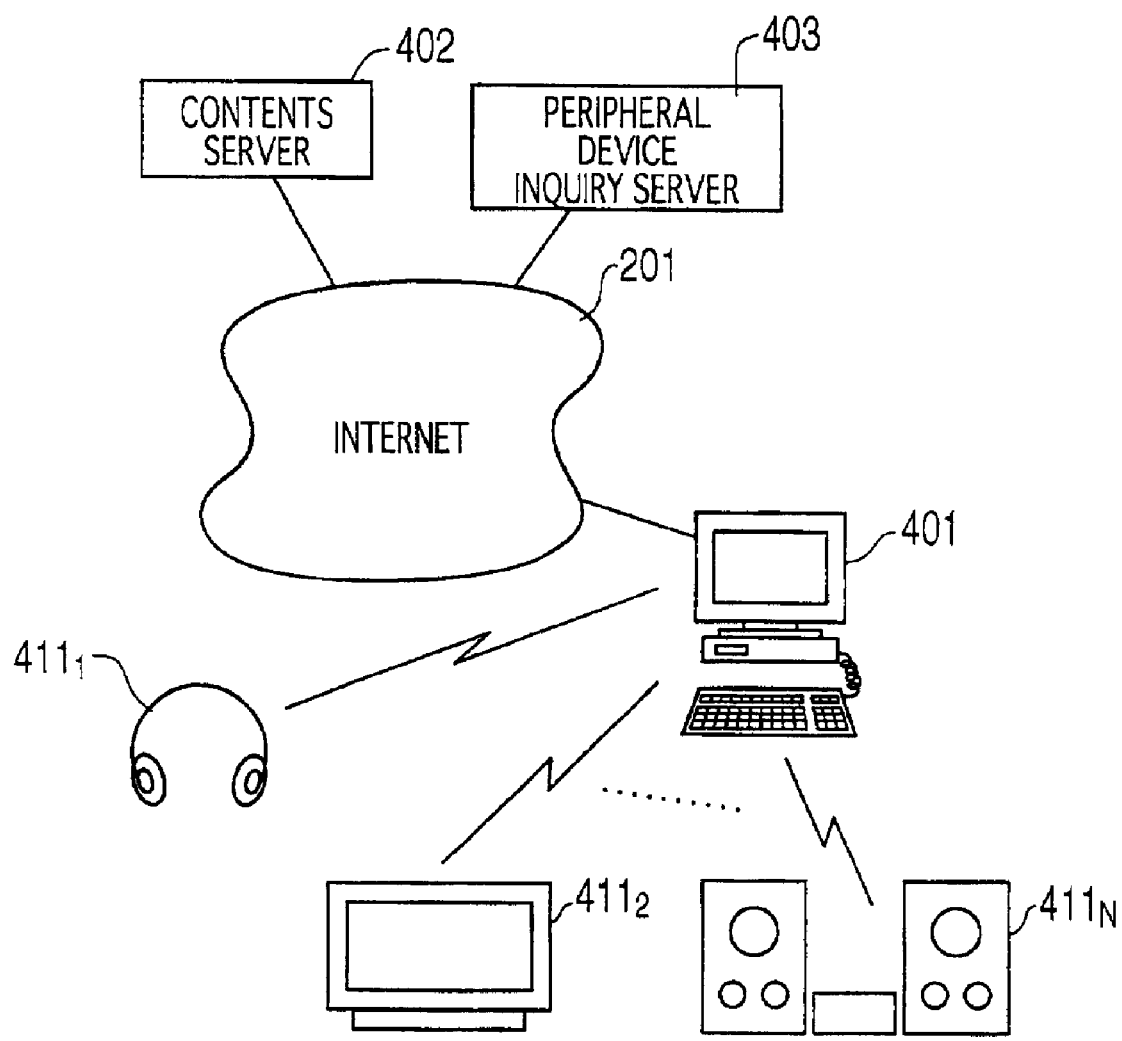
FIG. 21 is a diagram showing the overview of the system configuration of a modification of the content data acquiring system of the present invention.

FIG. 21 shows the outline of the content data acquiring system according to a modification of the embodiment of the present invention. In this modification, a personal computer 401 is connected with the Internet 201 as a tool which accesses to the Internet 201. A content data server 402 is connected to the Internet 201 to provide content data in addition to a peripheral device inquiring server 403.

The personal computer 401 accesses the server 402 to download content data from a desired URL. At this time, the computer 401 acquires an identifier contained in the content data for reproduction of various the file as in the foregoing embodiment. In the case of the foregoing embodiment, an owner of the computer 401 registers a relation between a peripheral device that the owner can use and various data (file). Therefore, if the registration is erroneously carried out, the ability of the peripheral device cannot be used fully, or the reproduction of the content data cannot be carried out fully. In addition, in case that the computer 401 has excellent portability as a laptop computer, a useable peripheral device is sometimes different, as in case where the owner goes to a party held in friend's home and uses a peripheral device there. There is a same problem with respect to the portable terminal 206 described in the foregoing embodiment.

For a person who intends to buy a peripheral device newly, if the peripheral device adaptive for reproduction of the content data of favorite homepages can be known, downloaded data is temporarily stored to be able to reproduce in the ideal state. Furthermore, as the case may be, reproduction of data of content data can be enjoyed by providing an ideal peripheral device from next time of download.

Therefore, in the content data acquiring system of the modification, the identifier acquired by the computer 401 is transmitted to the peripheral device inquiring server 403 such that the server 403 searches an adaptive peripheral device or the optimal peripheral device is selected from among the peripheral devices $411_1, 411_2, \ldots, 411_N$ which are capable of radio transmission and reception of data at present.

It should be noted that the modification is applicable to the first embodiment. In this case, the peripheral device inquiring server 403 may be provided on the WAP network as a WAP server or the Internet as an Internet server. Also, the personal computer 401 may be a portable terminal as a data processing apparatus.

Figure 22:
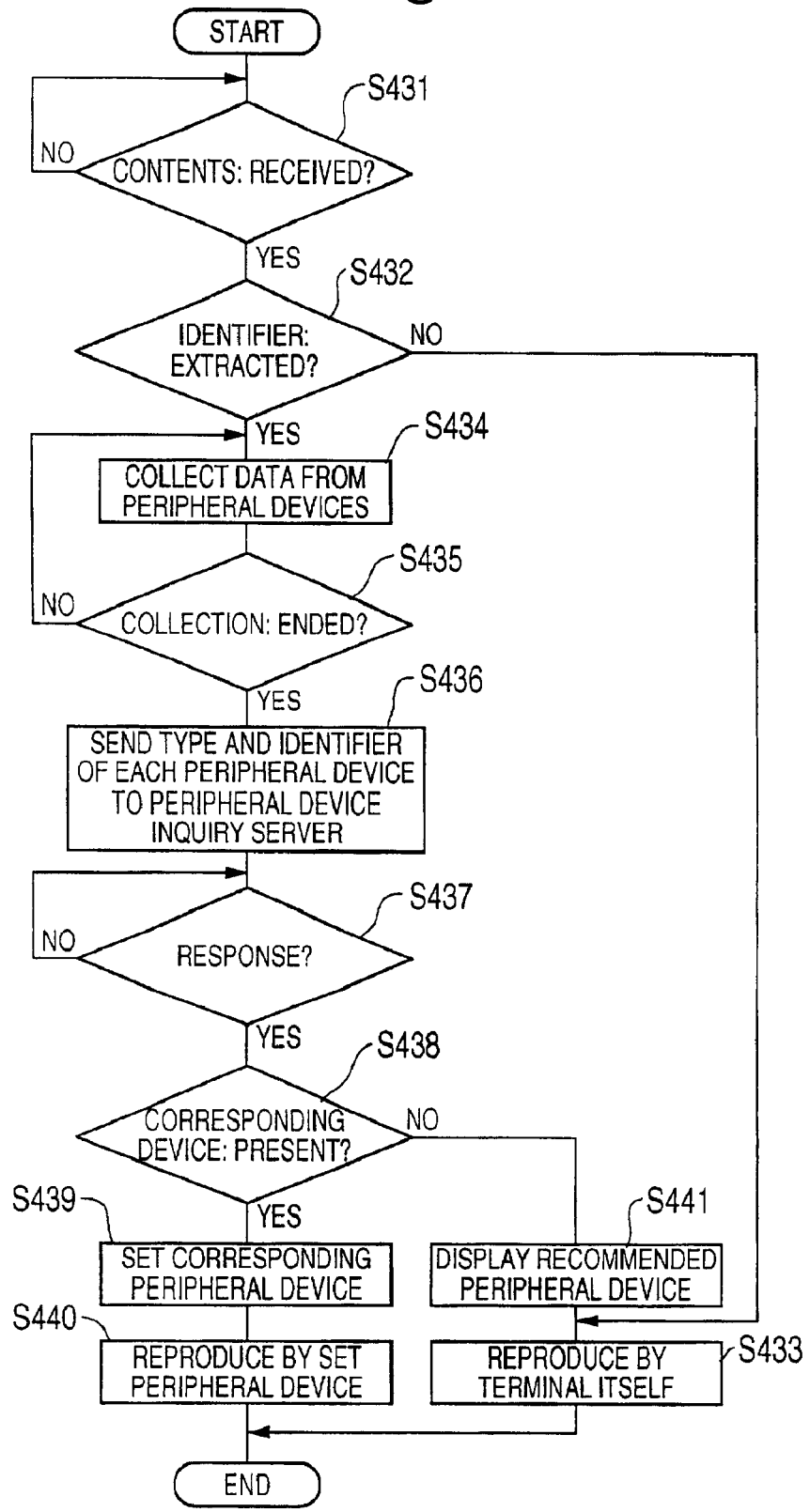
FIG. 22 is a flow chart showing a processing flow from content data reception to reproduction on the side of a terminal such as a personal computer in the modification.

FIG. 22 shows a processing flow from reception of content data to reproduction of the content data on the side of the personal computer in this modification. The personal computer 401 specifies URL to access the content data server 402. If the reception of content data is started (Step S431; Y), the computer 401 checks the presence of any identifiers indicating file property in the content data for selection of a peripheral device as described above (Step S432). When the identifier is not extracted, that is, when the identifier has been not incorporated in the content data at the time the content data is produced (N), the personal computer 401 reproduces the content data using a peripheral device provided in the personal computer 401 itself (Step S433).

On the other hand, when the identifier which is material for reproduction of a file can be extracted (Step S432; Y), the personal computer 401 collects data (peripheral device data) such as a type number of peripheral device, to be used to know reproduction ability of the peripheral device, with respect to various peripheral devices $411_1, 411_2, \ldots, 411_N$ which are capable of transmission and reception in radio standards such as Bluetooth (Step S434). This collection can be carried out by transmitting a predetermined radio signal for requesting peripheral device data from the personal computer 401 and by acquiring the data from the peripheral device which responds the radio signal. When the collection of the peripheral device data is ended (Step S435; Y), the personal computer 401 carries out an inquiring operation by transmitting the data such as a type number of the responding peripheral device $411_1, 411_2, \ldots, 411_N$ and the identifier extracted from the content data to the peripheral device inquiring server 403 (Step S436).

When a reply for the inquiry is sent from the peripheral device inquiring server 403 (Step S437; Y), the personal computer 401 determines whether any peripheral device adaptive for reproduction of the file of content data is present in various peripheral devices $411_1, 411_2, \ldots, 411_N$ for which the computer 401 has transmitted the request (Step S438). A peripheral device adaptive for the reproduction is existed (Y), the computer 401 sets the peripheral device adaptive for the reproduction as a reproducing device (Step S439) and the reproduction of the content data is carried out by use of the set peripheral device 411 (Step S440). At this time, if a plurality of peripheral devices adaptive for the reproduction exist, the device most adaptive for the reproduction is selected.

On the other hand, when peripheral device adaptive for the reproduction is not existed (Step S438; N), a recommendable peripheral device for the reproduction of the content data is displayed on the personal computer 401 (Step S441). For example, data is displayed in which there are two products, i.e., a product of X X of an A company and a product of ○○ of a B company with respect to reproduction frequency, and how much of these products, and which of the products is earlier offered on the market. The peripheral device inquiring server 403 may carries out the inquiring operation as business. The server 403 may be also operate based on cooperation money from the companies. The peripheral device inquiring server 403 widely stores data from old products to the latest products and renews these data. Therefore, the peripheral device more adaptive for reproduction may be directed based on an instruction issued previously, even if the peripheral devices adaptive for reproduction are set at the Step S439.

When a recommendable peripheral device is displayed under the absence of any peripheral device adaptive for reproduction at the Step S441, the reproduction of the content data is carried out by use of the personal computer 401 itself and a peripheral device such as speakers or CRT connected with the computer 401 at present (Step S433).

In the embodiment and modifications described above, the case is described in which that identifier for selection of a peripheral device is incorporated in content data. However, the present invention can also be applied to the case that such identifier is absent. For example, a server such as a peripheral device decoding server is provided and the file of the content data are once transferred to this server, which analyzes the file to generate an identifier corresponding to the file. In this case, the server acquiring the content data and the server acquiring the identifier for reproduction are different.

Furthermore, in the embodiment and modifications described above, the identifier incorporated in the content data is acquired. However, it is not necessary that the identifier is directly incorporated into the content data. In this case, a table is provided to indicate relation between the content data and the identifier for reproduction of the content data, and when the content data is acquired, the corresponding identifier is read out from the table.

As described above, according to the present invention, when the content data requesting means of the data processing terminal requests and acquires the desired content data from the content data server, the peripheral device adaptive for reproduction can be determined and selected, because the property which is requested for reproduction of the file of the content data is determined by use of the content data itself based on the determined property. Therefore, more excellent reproduction rather than reproduction by the data processing terminal itself can be carried out.

Also, according to the present invention, when the content data requesting means of the data processing terminal requests the desired content data from the content data server, the data processing terminal can easily determine the peripheral device adaptive for reproduction based on the identifier, because the means requests not only content data but also an identifier corresponding to the peripheral device adaptive for reproduction of reproduction the file of the content data. In addition, it is not necessary that the identifier is directly incorporated into the content data. Therefore, it is possible to flexibly comply with future specification changes.

Further, according to the present invention, when the content data requesting means of the data processing terminal acquires the desired content data from the content data server, the means simultaneously acquires not only the content data but also an identifier which is incorporated into the content data, and corresponds to peripheral device adaptive for reproduction of reproduction the file of the content data. Therefore, a peripheral device adaptive for reproduction of the content data can be easily determined by only acquiring the content data.

Further, according to the present invention, when the content data requesting means of the data processing terminal requests the desired content data from the content data server, the means requests data of a pair of the content data and an identifier adaptive for reproduction of the content data, and the property which is requested for reproduction of the reproduction the file of the content data is determined based on the acquired identifier. Therefore, the peripheral device adaptive for reproduction of the content data can be easily determined. In addition, it is not necessary that the identifier is directly incorporated into content data. Therefore, it is possible to flexibly comply with future specification changes.

Further, according to the present invention, when the content data requesting means of the data processing terminal acquires the desired content data from the content data server, the means simultaneously acquires not only the content data but also an identifier which is incorporated into the content data, and corresponds to the peripheral device adaptive for reproduction of the content data. Therefore, the data processing terminal can easily determine the peripheral device adaptive for reproduction of the content data by extracting the identifier from the content data.

Further, according to the present invention, the data processing terminal can transmit reproduction data to the peripheral device, because selection of the peripheral device can be carried out through provision of peripheral device selecting means for selecting the peripheral device having property determined by property determining means.

Further, according to the present invention, the data processing terminal can transmit reproduction data to the peripheral device because selection of the peripheral device can be carried out by the data processing terminal.

Moreover, according to the present invention, a data providing server is provided in a network, and a specific peripheral device can be retrieved when the category of the peripheral device is specified. Therefore, the peripheral device adaptive for reproduction of reproduction the file of the content data can be selected accurately, for example, from various products from old products to new products in environment where new products will be produced.

Further, according to a content data reproducing system of the present invention, the data processing terminal is connected with the peripheral device based on data concerning the peripheral device acquired by peripheral device data obtaining means. Therefore, most adaptive peripheral device can be selected from various peripheral device useable at the present time and the selected peripheral device can carry out reproduction of data.

Moreover, according to the present invention, when the side of the data processing terminal requests the data providing server to retrieve a specific peripheral device, the terminal searches peripheral devices capable of connecting with the terminal itself previously to transmit its data. Therefore, the most adaptive peripheral device can be selected from various peripheral devices searched by the peripheral device searching means. Thus, the decision of selection of the peripheral device can be trusted to the data providing server even if it is difficult to decide the most adaptive peripheral device for reproduction from various peripheral devices.

Furthermore, according to the present invention, a server for radio transmitting such as WAP server is provided, which compresses a description language of the content data to transmit the compressed description language on a radio to the terminal which has requested acquisition of the content data. The transmission of the description language to the portable terminal can be simplified. In addition, the portable terminal is provided with data acquiring means for acquiring the content data together with the identifier corresponding to the content data to be acquired, and peripheral device selecting means for selecting the peripheral device adaptive for reproduction of the acquired content data based on the identifier acquired by data acquiring means. Therefore, the content data can be reproduced excellently using the peripheral device.

What is claims is:

1. A content data acquiring system comprising:
    a portable terminal which issues a content data request for content data desired by a user, and receives a desired content data file to reproduce said desired content data from said desired content data file;
    a first server which is provided on a first network and which can provide first content data files written in a first language, wherein said first server transmits a desired one of said first content data files via said first network in response to said content data request when said content data request is destined to said first server;
    a second server which is provided on a second network as the Internet and which can provide second content data files written in a HTML (hypertext markup language) language, wherein said first language is different from said HTML language, and said second server transmits a desired one of said second content data files via said second network when said content data request is destined to said second server; and
    a gateway which is operatively connected with said portable terminal and said first and second servers, and transfers said content data request from said portable terminal to said first or second server based on said content data request, and transfers said desired content data file from said first or second server to said portable terminal;
    wherein said desired content data file includes an identifier indicating a category of said desired content data file;
    wherein said content acquiring system further comprises a plurality of peripheral devices respectively allocated with identifiers which are different from each other, and
    wherein said portable terminal comprises:
    a storage section which stores relations of one identifier and one peripheral device; and
    a control section which extracts at least an identifier from said desired content data file, determines whether said extracted at least an identifier is stored in said storage section, and transmits said desired content data file to at least one of said plurality of peripheral devices corresponding to said extracted at least an identifier such that said at least one peripheral device reproduces said desired content data from said desired content data file, when it is determined that said extracted at least an identifier is stored in said storage section.

2. The content data acquiring system according to claim 1, wherein said first server is a WAP (wireless access protocol) server, said first language is WML (wireless markup language) language, and said first network is a WAP network.

3. The content data acquiring system according to claim 1, wherein said portable terminal is a portable phone.

4. The content data acquiring system according to claim 1, wherein said portable terminal is a portable computer.

5. The content data acquiring system according to claim 1, wherein said gateway comprises
  a base station which transfers said content data request from said portable terminal, and transfer said desired content data file to said portable terminal; and
  a control unit which transfers said content data request transferred from said base station to said first or second server based on said content data request, and transfers said desired content data file to said base station, and said control unit comprises:
  a WML converting section which converts said desired content data file having a HTML data format and transmitted from said second server to have a WML data format, and converts said content data request having a WAP data format and transmitted from said base station to have an HTML data format and transmits said content data request having said HTML data format to said second server based on said content data request; and
  a data converting section which converts said desired content data file having said WML data format and transmitted from said first server or said WML converting section to have a WAP data format and transmits said desired content data file to said base station, and converts said content data request having said WAP data format and transmitted from said base station to have said WML data format and transmits said content data request having said WML format to said first server based on said content data request.

6. The content data acquiring system according to claim 1, wherein said desired content data file is classified into said category based on a size of said desired content data file.

7. The content data acquiring system according to claim 1, wherein said desired content data file is classified into said category based on a file format of said desired content data file.

8. The content data acquiring system according to claim 1, wherein said portable terminal reproduces said desired content data from said desired content data file, when it is determined that said extracted at least an identifier is not stored in said storage section.

9. The content data acquiring system according to claim 1, wherein said portable terminal transmits said desired content data file said at least one of said plurality of peripheral devices through a radio channel.

10. The content data acquiring system according to claim 1, wherein said portable terminal further comprises a display section, and
  wherein said control section controls said display section to display a menu screen in a peripheral device setting mode,
  said control section controls said display section to display said stored relations of said identifier and said peripheral device when a confirmation item of said menu screen is selected,
  said control section stores a new relation of said identifier and said peripheral device in said storage section when a new registration item of said menu screen is selected,
  said control section controls said display section to display said relations of said identifier and said peripheral device when a change item of said menu screen is selected, and stores a changed relation of said identifier and said peripheral device in said storage section when the displayed relation is changed, and
  said control section deletes all said stored relations of said identifier and said peripheral device when a all-deletion item of said menu screen is selected.

11. A content data acquiring system comprising:
  a portable terminal which issues a content data request for content data desired by a user, and receives a desired content data file to reproduce said desired content data from said desired content data file;
  a first server which is provided on a first network and which can provide first content data files written in a first language, wherein said first server transmits a desired one of said first content data files via said first network in response to said content data request when said content data request is destined to said first server;
  a second server which is provided on a second network as the Internet and which can provide second content data files written in a HTML (hypertext markup language) language, wherein said first language is different from said HTML language, and said second server transmits said desired one of said second content data files via said second network when said content data request is destined to said second server; and
  a gateway which is operatively connected with said portable terminal and said first and second servers, and transfers said content data request from said portable terminal to said first or second server based on said content data request, and transfers said desired content data file from said first or second server to said portable terminal;
  wherein said desired content data file includes an identifier indicating a category of said desired content data file;
  wherein said content data acquiring system further comprises:
  a plurality of peripheral devices connectable to said portable terminal; and
  a third server which is provided on said first or second network and transmits information of the most adaptive peripheral device to said portable terminal based on reception data of said plurality of peripheral devices and said identifier corresponding to said desired content data file, when any of said plurality of peripheral devices is adaptive, and
  wherein said portable terminal transmits said reception data to said third server and receives said information of the most adaptive peripheral device and transmits said desired content data file to the most adaptive peripheral device based on said information.

12. The content data acquiring system according to claim 11, wherein when said portable terminal transmits only said identifier or when there is no adaptive peripheral device in said reception data, said third server transmits a list of adaptive peripheral devices to said portable terminal.

13. A data processing terminal connectable a plurality of peripheral devices, comprising:
  a transmitting section which transmits a radio signal to a base station;
  a receiving section which receives a radio signal from said base station;
  a storage section which stores relations of an identifier and a peripheral device;
  a reproducing section which can reproduce desired content data from a desired content data file;
  an interfacing section which can transmit and receive a signal; and
  a control section which controls said transmitting section to transmit a content data request to said base station, extracts at least an identifier from said desired content data file received by said receiving section in response to said content data request, searches said storage section to determine whether said extracted at least an identifier is stored in said storage section, and transmits said desired content data file to said peripheral device adaptive for said at least an identifier without reproduction of said desired content data by said reproducing section, when it is determined that said extracted at least an identifier is stored in said storage section.

14. The data processing terminal according to claim 13, wherein said control section controls said reproducing section to reproduce said desired content data from said desired content data file when it is determined that said extracted at least an identifier is not stored in said storage section.

15. The data processing terminal according to claim 13, wherein said interfacing section is detachable.

16. The data processing terminal according to claim 13, wherein said interfacing section transmits said desired content data file to said adaptive peripheral device through a radio channel.

17. The data processing terminal according to claim 13, wherein said identifier indicates a category of said desired content data file.

18. The data processing terminal according to claim 17, wherein said desired content data file is classified into said category based on a size of said desired content data file.

19. The data processing terminal according to claim 17, wherein said desired content data file is classified into said category based on a file format of said desired content data file.

20. The data processing terminal according to claim 13, wherein said data processing terminal has a portable phone function.

21. The data processing terminal according to claim 13, wherein said control section controls a display section of said reproducing section to display a menu screen in a peripheral device setting mode, said control section controls said display section to display said stored relations of said identifier and said peripheral device when a confirmation item of said menu screen is selected, said control section stores a new relation of said identifier and said peripheral device in said storage section when a new registration item of said menu screen is selected, and said new relation is inputted, said control section controls said display section to display said relations of said identifier and said peripheral device when a change item of said menu screen is selected, and stores a changed relation of said identifier and said peripheral device in said storage section when the displayed relation is changed, and said control section deletes all said stored relations of said identifier and said peripheral device when a all-deletion item of said menu screen is selected.

22. The data processing terminal according to claim 13, wherein said control section transmits device data indicating said peripheral devices connected to said data processing terminal an inquiry server and receives information of the most adaptive peripheral device in response to said device data, and transmits said desired content data file to the most adaptive peripheral device based on said information.

23. A content data acquiring system comprising:

a peripheral device corresponding to an identifier;

a portable terminal which issues a content data request for content data desired by a user, and receives a desired content data file to extract said identifier from said desired content data file and controls said peripheral device to reproduce said desired content data from said desired content data file;

a server which is provided on a network and which transmits a desired content data file via said network in response to said content data request;

a gateway which is connected to said portable terminal and said server and transfers said content data request from said portable terminal to said server, and transfers said desired content data file from said server to said portable terminal;

a plurality of peripheral devices connectable to said portable terminal; and an inquiry server which is provided on said network and transmits information of a peripheral device most adaptive for reproduction of said desired content data to said portable terminal based on device data of said plurality of peripheral devices and said identifier extracted from said desired content data file, when any of said plurality of peripheral devices is adaptive, and wherein said portable terminal transmits said device data to said inquiry server and receives said information of the most adaptive peripheral device and transmits said desired content data file to the most adaptive peripheral device based on said information.

24. The content data acquiring system according to claim 23, wherein said server is a WAP (wireless access protocol) server, said desired content data file is written in a WML (wireless markup language) language, and said network is a WAP network.

25. The content data acquiring system according to claim 23, wherein said gateway comprises:

a base station which transfers said content data request from said portable terminal, and transfers said desired content data file to said portable terminal; and a control unit which transfers said content data request transferred from said base station to said server, and transfers said desired content data file from said server to said base station, and said control unit comprises:

a data converting section which converts said desired content data file having said WML data format and transmitted from said server to have a WAP data format and transmits said desired content data file having said WAP data format to said base station, and converts said content data request having said WAP data format and transmitted from said base station to have said WML data format and transmits said content data request having said WML format to said server based on said content data request.

26. The content data acquiring system according to claim 25, wherein said server is an Internet server, said desired content data file is written in an HTML (Hypertext markup language) language, and said network is the Internet.

27. The content data acquiring system according to claim 26, wherein said control unit comprises:

a converting section which converts said desired content data file having a HTML data format and transmitted from said server to have a WML data format, converts said desired content data file having said WML data format to have a WAP data format and transmits said desired content data file having said WAP data format to said base station, and converts said content data request having said WAP data format and transmitted from said base station to have an HTML data format and transmits said content data request having said HTML data format to said server based on said content data request.

28. The content data acquiring system according to claim 23, wherein said portable terminal is a portable phone.

29. The content data acquiring system according to claim 23, wherein said portable terminal is a portable computer.

30. The content data acquiring system according to claim 23, wherein said desired content data file is classified to have said identifier based on a size of said desired content data file.

31. The content data acquiring system according to claim 23, wherein said desired content data file is classified to have said identifier based on a file format of said desired content data file.

32. The content data acquiring system according to claim 23, wherein when said portable terminal transmits only said identifier or when there is no adaptive peripheral device in said device data, said inquiry server transmits a list of adaptive peripheral devices to said portable terminal.

* * * * *